June 6, 1933.  D. R. WILLS  1,912,612
GAS TORCH
Filed March 27, 1930   2 Sheets-Sheet 1

Inventor
Donald R. Wills

By
Attorney

Inventor
Donald R. Wills

Patented June 6, 1933

1,912,612

UNITED STATES PATENT OFFICE

DONALD R. WILLS, OF DAYTON, OHIO

GAS TORCH

Application filed March 27, 1930. Serial No. 439,471.

This invention relates to welding torches, and has particular reference to an improved torch of this character wherein low cost illuminating or heating gas, either naturally or artificially produced, may be utilized for producing a flame of sufficient intensity to melt or braze non-ferrous metals such as brass, copper, and other soft metals or alloys.
The primary object of the present invention resides in the provision of a welding torch which, due to its novel construction, can make use of natural gas commonly found available in manufacturing plants, machine shops, garages or other working places where a tool of this kind is used and for this reason the tool is cheaper to operate than torches using acetylene or other costly gases.
Another object is to provide a welding torch of simple construction and to eliminate costly equipment which is necessary for the operation of similar torches now found on the market.
A further object of the invention is to provide a torch wherein gas and air under pressure is introduced into a common hose or conduit leading to a burner head, thus eliminating the handling of more than one hose which is cumbersome and thereby facilitating the handling and working of the tool.
A still further object of the invention rests in a tool of the above nature and wherein is embodied a burner head attached to the outer working end of a flexible conduit, the burner head being of special construction and formed with a burner tip or outlet orifice situated within and at one end of a combustion chamber or cavity provided in the outer portion of the head, said combustion chamber terminating in a restricted outlet end, which by the provision thereof and the position and shape of the burner tip produces an intensely hot flame, which has its hottest portion near the outlet of the head. This is a great advantage in that the flame may thus be directed or confined to a restricted portion or localized area of the work without unduly heating the surrounding portions of the work.

Figure 1:
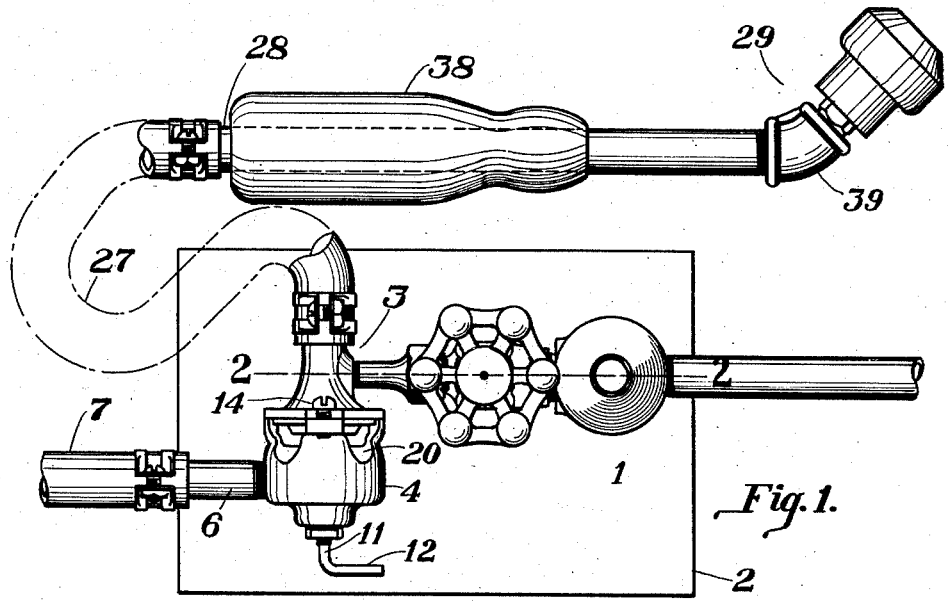
Figure 2:
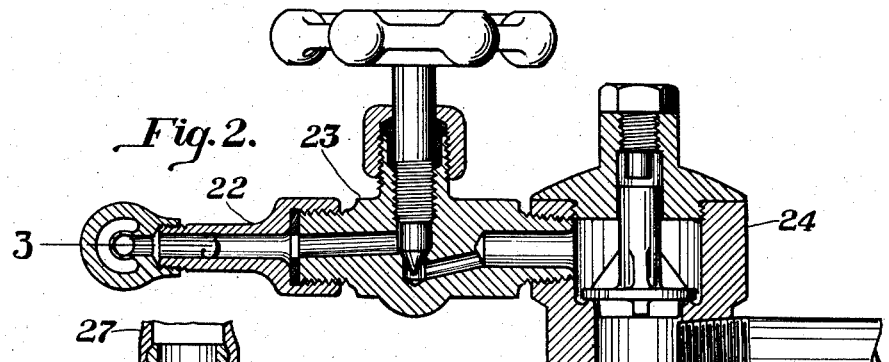
Figure 3:
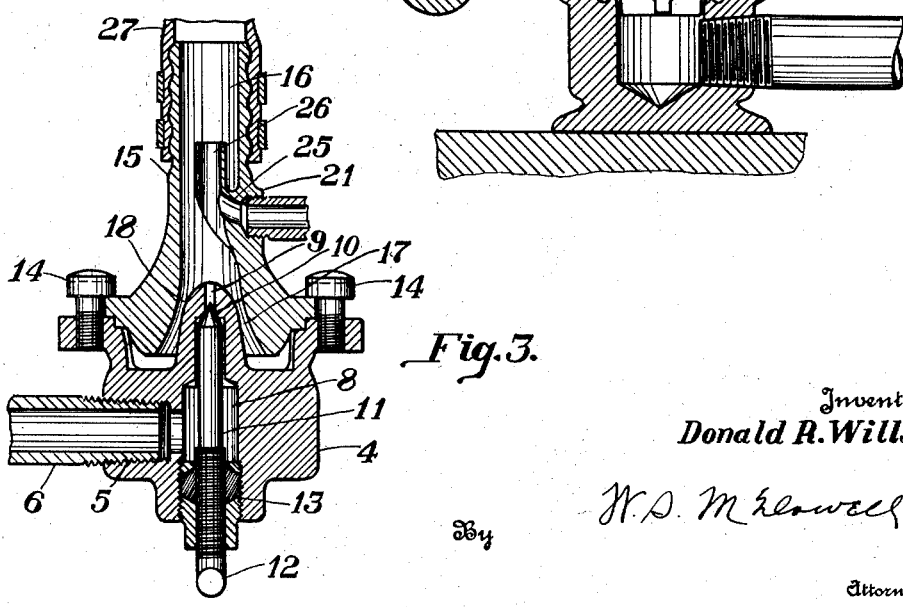
Figure 4:
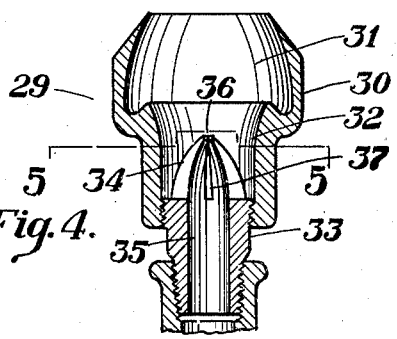
Figure 5:
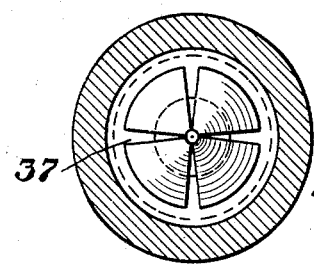
Figure 6:
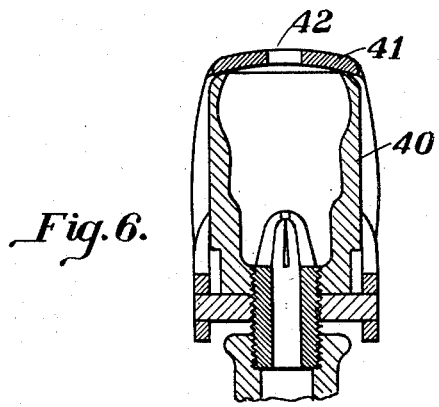
Figure 7:
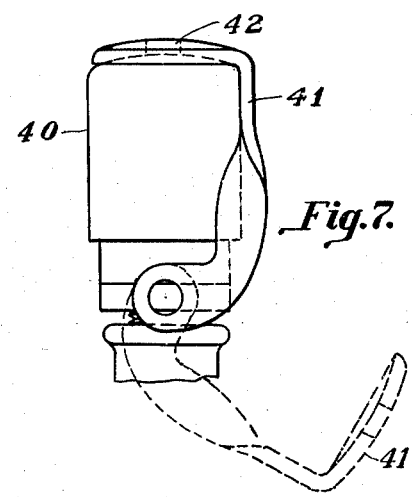
Figure 9:
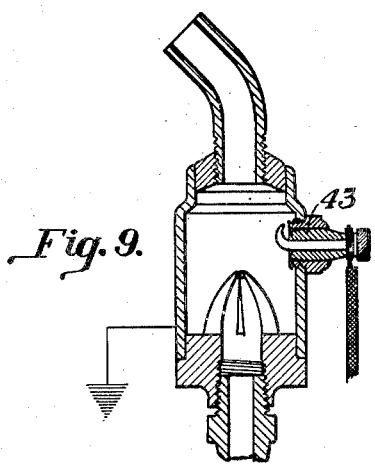
Figure 8:
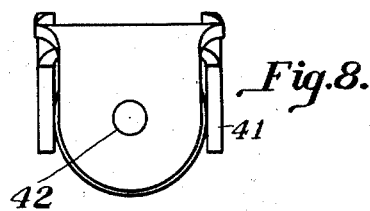

With these and other objects in view, as will appear as the description proceeds, the invention accordingly consists in the novel features of construction, combination of elements and arrangement of parts hereinafter fully described and having the scope thereof pointed out in the appended claims.
In the accompanying drawings forming part of the specification:
Figure 1 is a plan view showing the parts of the welding torch structure comprising the present invention,
Figure 2 is an enlarged vertical sectional view taken on the line 2—2 of Figure 1,
Figure 3 is a horizontal sectional view taken on the line 3—3 of Figure 2,
Figure 4 is a detail vertical sectional view of the nozzle,
Figure 5 is a horizontal sectional view taken on the line 5—5 of Figure 4, Figure 6 is a vertical sectional view taken through a nozzle of slightly modified structure,
Figure 7 is a side elevation thereof,
Figure 8 is a top plan view thereof, and Figure 9 is a view of a still further modified form of the invention.
Similar characters of reference denote like or corresponding parts throughout the several views of the drawings.
The torch or tool 1 comprising the present invention consists essentially of a structure whereof the working end thereof may be brought near the work at hand and which due to its light-weight construction is capable of being manipulated by one hand with the requisite skill and convenience. To this end, the tool or torch comprises a base 2 for supporting a fuel mixer 3 thereon and which base may be formed of any suitable material and made portable for convenient placing near the work. In cases where welding is performed at a certain definite place the base may be secured to a supporting structure. The fuel mixer 3 as illustrated in the drawings, although capable of being constructed in various ways, has been found satisfactory for this purpose and consists of a casing 4 provided with a bore 5 for the reception of a threaded end of a short pipe section 6 to which is clamped one end of a flexible conduit 7 leading to an air supply (not shown) which may be a storage tank for compressed air or a compressor unit.

The inner end of the pipe section 6 communicates with a passage 8 located axially of the casing 4 and formed with a restricted port 9 at its inner end. Controlling this port is the inner conical end 10 of a needle valve 11 formed with an exterior manipulating handle 12 and having a portion thereof extending through a threaded packing gland 13. By rotating the needle valve 11 the port may be controlled to vary the flow of air therethrough. Secured to the casing 4 by means of screws 14 is a mixing tube 15, having its bore 16 located in axial alignment with the passage 8 and the port 9 of the casing 4. The inner end of the bore 16 is enlarged as at 17 to accommodate the tip 18 in which the port 9 is formed and also to form a passage communicating with openings 20 formed between the casing 4 and the mixing tube 16 for the introduction of atmospheric air into the tube.

Formed in the side of the tube 16 is a threaded boss 21 for the reception of the inner end of a gas conveying line 22 in which the regulating valve 23 and a check valve 24 are located. Formed in the boss 21 is a restricted port 25 communicating with the bore 16. Formed with the boss 21 and positioned axially within the bore 16 is a short tubular section 26 open at its ends and lying in close proximity to the port 9 of the casing 4. It will be seen that as the air under pressure passes through the port 9 by way of the pipe 6 and the passage 8 the same will tend to create a suction at the inner end of the port 25 causing the gas from the line 22 to flow through the port 25 and into the mixing tube 15. This inrush of air through the port 9 also causes atmospheric air to be sucked in through the openings 20 and through the enlarged end 17 of the tube which air will mix with the gas and the compressed air forming a combustible mixture. The amount of gas flowing through the line 22 may be governed by the manipulation of the valve 23.

Connected with the open end of the mixing tube 15 in any suitable manner, as by means of a clamp or the like, is a flexible conduit member 27 which may be of any suitable length and leads to a pipe section 28 forming a part of the nozzle structure 29.

The nozzle structure 29 to which the invention is primarily directed, comprises a head 30 in the upper end of which is formed an enlarged chamber 31 open at its upper end and forming the outlet mouth of the nozzle. The other end of the head 30 is formed with a bore 32 which has a flared upper end and terminates in the chamber 31. The lower end of the bore 32 is threaded for the reception of a nipple 33 of the burner tip 34. The inner end of the burner tip 34 is dome shaped and positioned within the bore 32. The bore 35 of the burner tip terminates at its inner end in a reduced opening 36 formed at the apex of the burner tip. The burner tip is also formed with radially disposed slots 37 extending the full height of the dome shaped end and terminates in the opening 36. The slots 37 are greater in width at their lower ends and taper upwardly into closed ends at the opening 36. These triangular shaped slots may be formed by contracting the dome at its upper end.

By this peculiar shaped burner tip the combustible mixture is passed through the opening 36 in a fine axially directed stream and a portion thereof will also emanate through the slots 37 and strike the side walls of the bore 32 and set up a turbulent action of the gas and air mixture around the central stream which together will find its exit through the open mouth portion of the burner head. It will be noted that the walls of the chamber 31 slope inwardly thus producing a conical or tapered shape flame which is of great intensity at the converging point of the cone. The length of this conical flame may be governed by the slope of the side walls at the upper end of the chamber 31.

An important feature of the nozzle structure is the closed compartment formed by the cylindrical side walls of the chamber 31 and bore 32, which compartment is open only at its top end and thus the high temperatures developed by the igniting of the fuel within the compartment can only escape through the open top thereof and due to the somewhat restricted size of the opening produces a flame of great velocity and force and one which has an extremely high temperature. It will also be evident from an inspection of Figure 4 particularly, that the chamber 31 is enlarged at its lower end producing a pocket wherein the fuel or ignited gas is momentarily held or agitated before joining the centrally directed stream passing through the nozzle. This enlargement or pocket has been found to be of great importance in that it permits the air and gas to be turned on at full force, which may vary from four to fifty pounds, without the danger of having the flame become extinguished or affecting the nature thereof. This is perhaps due to the fact that the entrapped fuel or gas within the pocket acts as a feeder for the stream issuing from the opening 36 formed in the burner tip.

For convenient handling of the nozzle structure, a handle 38 may be provided upon the pipe section 28 and an angular pipe connection 39 may be positioned between the pipe section 28 and the burner head 30 to provide for a more correct angle between the torch and the work.

In the modified form of the invention disclosed in Figures 6, 7 and 8 the burner head 40 is provided with a swinging cover 41 formed with an opening 42 of comparatively small diameter when compared with the open upper end of the head. By the use of the swinging cover 41 with the small opening therein, a flame of pencil like form may be produced, which flame is desirable when the torch is used in connection with work of delicate character as the flame may thus be directed to a certain localized portion or confined to a small area without heating the surrounding portions of the work. In this form of the invention the inner wall of the compartment forming the inner head although slightly different in shape from the preferred form is also sloped inwardly at its upper end to form a somewhat restricted outlet opening in the head which has a tendency to direct the ignited gas inwardly into a single flame or shaft of fire. It has been found that in order to light the torch by a match or other means exterior of the torch, the opening formed in the outer end of the chamber must be larger than the diameter of the inner end or bottom of the chamber. Thus, when lighting the burner disclosed in the modified form the cover 41 may be swung to one side and after the torch has been lighted the same may be swung back in operative alignment with the head to produce the narrow flame.

The structure disclosed in Figure 9, has an electrode extending through the side walls of the chamber by which the torch may be lighted, eliminating the use of matches. This method of lighting the torch is also advantageous in that the torch may be quickly lighted and that it permits the same to be lighted under water for special kinds of work.

Although the burner head has been described as used in connection with a welding torch it will be understood that the same may be adapted to many other uses such as a burner structure within a stove, furnace or the like, under a crucible for melting metal or alloys and other places where a well directed and hot flame is desired.

From the foregoing description taken in connection with the accompanying drawings it will be seen that a torch structure is provided having a novel construction and one which may use comparatively cheap fuel in its operation and one which may be easily installed without the need of expensive equipment. The torch has the advantage of being easy to operate and keep in operation without the necessity of delicate adjustments which are found necessary in torches now in use.

What is claimed is:

1. A welding torch comprising a mixer for air and gas, a conduit for the mixed fuel leading from said mixer to a nozzle structure provided at the outer end of said conduit, said nozzle structure comprising a head formed with a chamber open at one end only, a burner tip arranged at the opposite end to close the same and extending within said chamber and attached to said conduit, said burner tip being provided with slots at its outer end forming fuel orifices.

2. A welding torch comprising a mixer unit in which air and gas are commingled into a combustible mixture, a conduit leading from said mixer unit to a nozzle structure, said nozzle structure comprising a head formed with a chamber open at one end, a burner tip having a dome shaped end positioned at the inner end of said chamber and in the longitudinal axis thereof, said burner tip being provided with a restricted opening located at the upper end of said dome shaped end, said burner tip being also provided with slots extending radially from said opening and being of a height substantially equal to that of said dome.

3. A nozzle for a welding torch comprising a head provided with a chamber open at one end, a burner tip having a dome shaped end positioned at the inner end of said chamber and formed with a restricted opening disposed centrally of and at the upper end of said dome, said dome being provided with slots extending radially from the opening therein and of a height substantially equal to that of said dome, said slots tapering upwardly into closed ends, and a conduit attached to the outer end of said burner tip for the delivery of gaseous fuel to said nozzle.

4. A nozzle for a welding torch comprising a head provided with a chamber therein open at one end, said opening being of a diameter smaller than the intermediate portion of said chamber, a burner tip removably positioned at the inner end of said chamber and formed with a restricted opening at the upper end thereof, said tip being also provided with slots extending radially from said opening and downwardly along the side wall of said tip, and means for delivering a fuel mixture to said nozzle.

5. In a device of the character described comprising a head formed with a chamber having an opening at one end, said chamber being provided with an enlargement intermediate thereof and with a reduced inner end, a burner tip positioned within the reduced portion of said chamber and formed with a restricted opening therein in axial alignment with the longitudinal axis of said chamber, said burner tip being also formed with radially directed slots extending from said restricted opening to a point adjacent the reduced inner end of said chamber.

6. A welding torch comprising a mixer for air and gas, a conduit for the mixed fuel leading from said mixer to a nozzle structure provided at the outer end of said conduit, said nozzle structure comprising a head formed with a chamber open at its outer end, a burner tip arranged at the inner end of said chamber and extending thereinto, and a swinging cover for the open end of said chamber having a restricted opening therein.

7. A welding torch comprising a mixer for air and gas, a conduit for the mixed fuel leading from said mixer to a nozzle structure provided at the outer end of said conduit, said nozzle structure comprising a head formed with a chamber open at one end, a burner tip arranged at the inner end of said chamber, and a hinged cover member formed with a restricted opening therein for closing the outer open end of said chamber.

In testimony whereof I affix my signature.

DONALD R. WILLS.